US012568561B2

(12) United States Patent
Liang et al.

(10) Patent No.: US 12,568,561 B2
(45) Date of Patent: Mar. 3, 2026

(54) LIGHT SYSTEM WITH SIGNAL SHAPING MODULE

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 38 days.

(21) Appl. No.: 18/797,546

(22) Filed: Aug. 8, 2024

(65) Prior Publication Data

US 2025/0324496 A1 Oct. 16, 2025

(30) Foreign Application Priority Data

Apr. 10, 2024 (CN) ........................ 202420730525.X

(51) Int. Cl.
*H05B 45/325* (2020.01)
*H05B 47/18* (2020.01)

(52) U.S. Cl.
CPC ......... *H05B 45/325* (2020.01); *H05B 47/184* (2024.01)

(58) Field of Classification Search
CPC ..... H05B 45/54; H05B 45/325; H05B 47/184
See application file for complete search history.

(56) References Cited

U.S. PATENT DOCUMENTS

2002/0038157 A1* 3/2002 Dowling .............. H05B 47/155 700/90
2002/0047646 A1* 4/2002 Lys ........................... F21S 4/28 315/312
2013/0193879 A1* 8/2013 Sadwick .............. H05B 45/385 315/307
2013/0320885 A1* 12/2013 Griebel .................. H05B 47/10 315/312
2014/0266389 A1* 9/2014 Sadwick .................. H04B 3/54 327/333
2014/0361701 A1* 12/2014 Siessegger ........... H10H 20/857 315/307
2019/0098723 A1* 3/2019 Sadwick ............ H05B 45/3725
2020/0137859 A1* 4/2020 Yan ......................... H04L 61/50
2023/0095732 A1* 3/2023 Ono ..................... H05B 47/155 315/294
2024/0260150 A1* 8/2024 Puvanakijjakorn .... H05B 45/14

FOREIGN PATENT DOCUMENTS

CN 201955646 U * 8/2011
DE 102016105739 A1 * 10/2016 ........... H05B 47/175

* cited by examiner

*Primary Examiner* — Abdullah A Riyami
*Assistant Examiner* — Syed M Kaiser
(74) *Attorney, Agent, or Firm* — Frank Niranjan

(57) ABSTRACT

The invention provides a light system with a signal shaping module. In view of the problems of signal errors of DMX signals caused by a large number of lights and a long signal transmission distance between lights, an optocoupled isolation module and a signal processing module are arranged to reshape a received DMX signal to effectively filter an interference signal out of the DMX signal and correct the width of the DMX signal to avoid errors caused by the change in data rate to realize error-correction shaping of the transmitted signal, such that the transmission distance of the DMX signal is effectively prolonged, thus improving signal transmission accuracy and stability.

4 Claims, 3 Drawing Sheets

LIGHT SYSTEM WITH SIGNAL SHAPING MODULE

FIELD

The invention relates to the technical field of light signal transmission, in particular to a light system with a signal shaping module.

BACKGROUND

In traditional decorative light projects, with the increase in the number of lights or the length of a signal line between lights, a digital multiplex (DMX) signal will distort under the influence of input resistance and capacitance, leading to a rising or falling delay of the data signal, that is, it will take a longer time for the signal to turn from a low level to a high level or from a high level to a low level as compared with that in an ideal condition. For digital signals, such a delay may result in a decrease or an increase of the width of each bit in data, thus changing the communication rate of the signal, causing signal errors, and reducing data transmission accuracy and stability. Moreover, data will be interfered during long-distance transmission on the signal line, and the interfered signals will be integrated with the DMX signal to be transmitted, which results in the accuracy of data transmission being reduced.

Therefore, to solve the problem of signal errors caused by the connection of a large number of lights and a long signal transmission distance between lights, it is necessary to provide a light system with a signal shaping module.

SUMMARY

In view of the problem of signal errors caused by the connection of a large number of lights and a long signal transmission distance between lights, the invention provides a light system with a signal shaping module, which can perform error-correction shaping on transmitted signals to improve signal transmission accuracy and stability.

In one aspect, the present invention provides a light system with a signal shaping module which comprises an LED light system and a signal shaping module. The LED light system comprises a power supply, an LED controller, and a plurality of lights connected in series to the LED controller by means of a signal line; the power supply is configured to supply power to the lights, the lights are connected in series by means of a power line, and the LED controller are configured to output a DMX signal for controlling the lights to each of the light by the signal line. The signal shaping module comprises an optocoupled isolation module and a signal processing module; the optocoupled isolation module and the signal processing module are sequentially connected in series to the signal line between any adjacent two of the lights that are connected in series; the optocoupled isolation module is configured to filter out an interference signal from the DMX signal input from the signal line to a corresponding one of the adjacent two of the lights; the signal processing module is configured for automatically detecting and receiving the DMX signal processed by the optocoupled isolation module and outputting the DMX signal to the corresponding one of the adjacent two of the lights at a preset baud rate; and the preset baud rate is the same as a baud rate of the DMX signal output by the LED controller.

Preferably, the optocoupled isolation module is an optoisolator.

Preferably, the signal processing module is an MCU.

Preferably, each of the lights comprises a signal processor and a plurality of LED lamp beads; the signal processor is configured for receiving and decoding the DMX signal to generate a PWM signal to drive the LED lamp beads to work.

The invention has the following beneficial effects: in view of the problems of signal errors of DMX signals caused by a large number of lights and a long signal transmission distance between lights, the invention provides a light system with a signal shaping module, which can reshape a received DMX signal by means of an optocoupled isolation module and a signal processing module to effectively filter an interference signal out of the DMX signal and correct the width of the DMX signal to avoid errors caused by the change in data rate to realize error-correction shaping of the transmitted signal, such that the transmission distance of the DMX signal is effectively prolonged, thus improving signal transmission accuracy and stability.

REFERENCE SIGNS

1, power supply; 2, LED controller; 3, signal line; 4, light; 5, power line; 6, signal shaping module; 61, optocoupled isolation module; 62, signal processing module.

DESCRIPTION OF THE EMBODIMENTS

To gain a better understanding of the above purposes, features and advantages of the invention, the invention will be described in further detail below in conjunction with accompanying drawings and specific embodiments. It should be noted that the embodiments of the application and features in the embodiments can be combined without conflicts.

Figure 1:
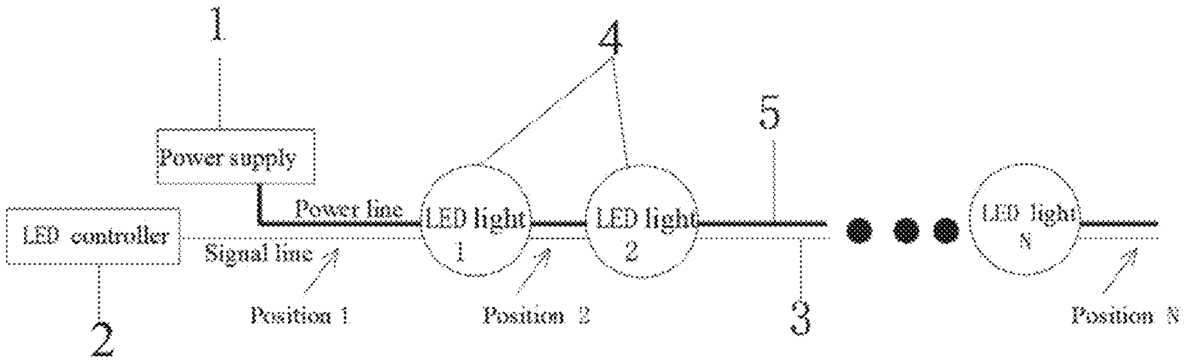
FIG. 1 is a schematic principle diagram of a light system with a signal shaping module according to the invention.
Figure 2:
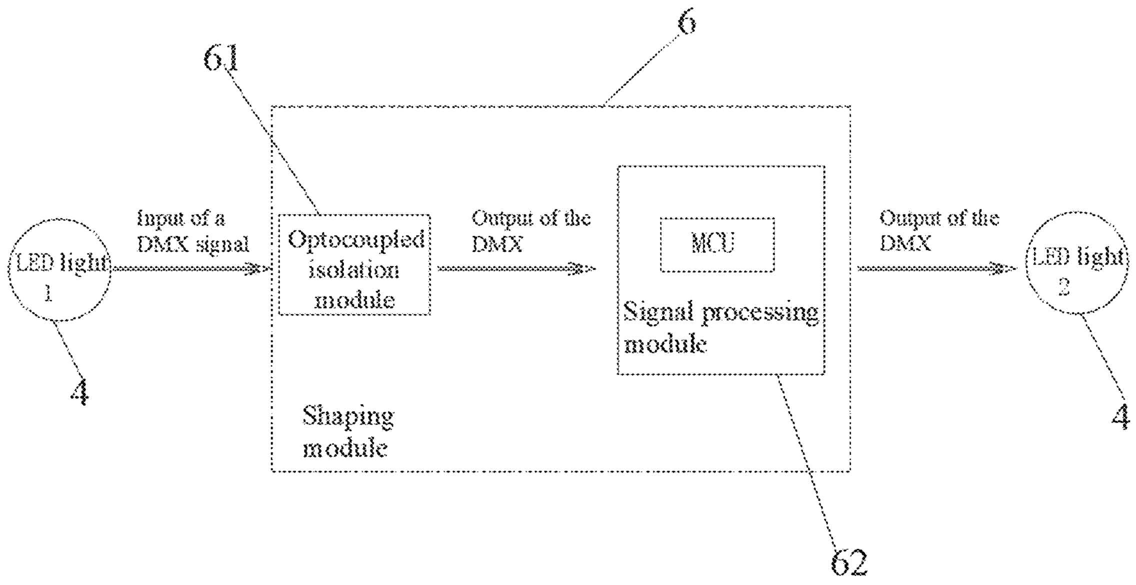
FIG. 2 is a schematic structural diagram of the light system according to the invention.

Referring to FIGS. 1 and 2, a light system with a signal shaping module comprises an LED light system and a signal shaping module 6.

Specifically, the LED light system comprises a power supply 1, an LED controller 2, and a preset number of lights 4 connected in series to the LED controller 2 by means of a signal line 3. The power supply 1 is configured to supply power to the lights 4, and the lights 4 are connected in series by means of a power line 5.

The LED controller 2 transmits a DMX signal for controlling the lights 4 to each light 4 at a fixed baud rate by means of the signal line 3. The lights 4 comprises the first light to the Nth light. The first light is closest to the controller 2.

The signal shaping module 6 comprises an optocoupled isolation module 61 and a signal processing module 62. The optocoupled isolation module 61 and the signal processing module 62 are sequentially connected in series to the signal line between any two lights 4 that are connected in series.

Figure 3:
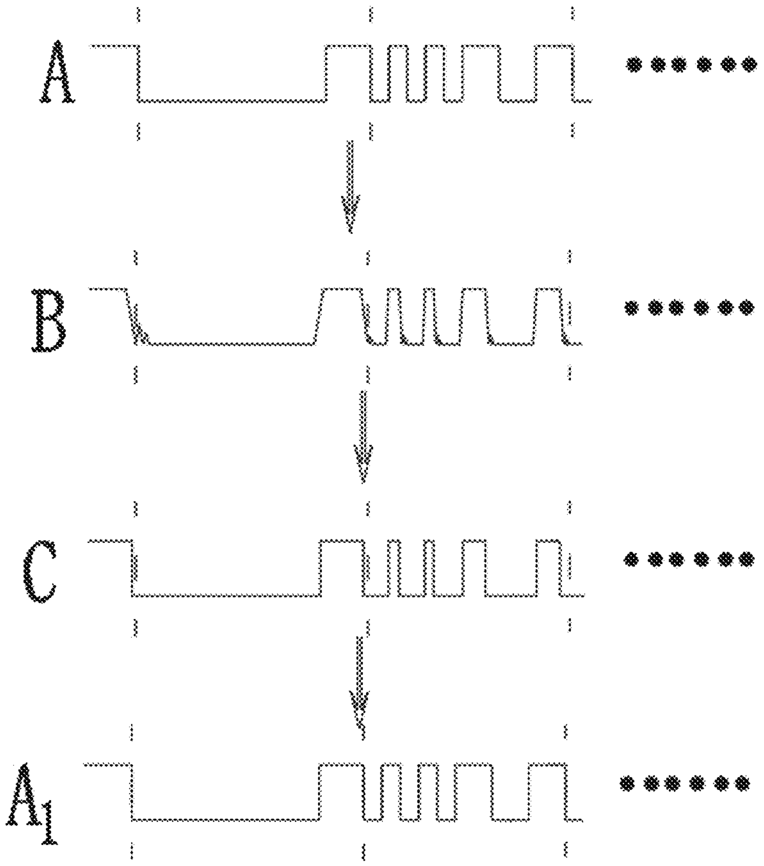
FIG. 3 is a schematic diagram of DMX signal shaping waveforms according to the invention.

Referring to FIGS. 2 and 3, the waveform of the DMX signal output by the LED controller 2 to the first light 4 connected to the LED controller 2 is the waveform A as shown in FIG. 3. During transmission between multiple lights 4 or long-distance transmission, the DMX signal will contain an interference signal and distort, and the waveform of the DMX signal will change into the waveform B as shown in FIG. 3.

The optocoupled isolation module 61 is configured for filtering out the interference signal mixed in the DMX signal which is input from the signal line 3 to the next light 4. For example, when the signal shaping module 6 is arranged between the first light and the second light, the next light 4 refers to the second light 4. When the signal shaping module 6 is arranged between the second light and the third light, the next light 4 refers to the third light 4. In this embodiment, the optocoupled isolation module 61 is specifically an optoisolator. The optoisolator can isolate its input terminal from its output terminal by optical isolation to effectively prevent the propagation of interference signals and electrical noise and ensure that the output terminal can receive clear and stable signals. By arranging the optocoupled isolation module 61, the interference signal can be filtered out of the DMX signal, and the waveform B in FIG. 3 changes into the waveform C in FIG. 3.

The signal processing module 62 is configured for automatically detecting the DMX signal processed by the optocoupled isolation module 61, receiving the DMX signal at a suitable baud rate selected according to the processed DMX signal, and outputting the received DMX signal to the next light 4 at a preset baud rate. Wherein, the preset baud rate is the same as the baud rate of the DMX signal output directly from the LED controller 2. For example, if the baud rate of the DMX signal output by the LED controller 2 is 500 K, the baud rate of the DMX signal output from the signal processing module 62 is automatically set to 500 K.

After the interference signal is filtered out of the DMX signal processed by the optocoupled isolation module 61, the waveform of the DMX signal is corrected, but the width of the signal is increased or decreased uncontrollably, so the width of the DMX signal processed by the optocoupled isolation module 61 needs to be adjusted. The signal processing module 62 detects the DMX signal processed by the optocoupled isolation module 61 and receives the DMX signal at a matching baud rate, and then outputs the DMX signal at the preset baud rate, such that the baud rate of the DMX signal processed by the optocoupled isolation module 61 is kept consistent with the baud rate of the DMX signal output by the LED controller 2, thus reshaping the wave of the data, the signal width of which has been distorted to some extent. In this embodiment, the optocoupled isolation module 61 is specifically an optoisolator, and the signal processing module 62 is specifically an MCU.

The signal processing module 62 is arranged to shape the DMX signal processed by the optocoupled isolation module 61, such that the waveform C as shown in FIG. 3 is changed into a waveform $A_1$ which is identical with the waveform A in FIG. 3.

Each light 4 comprises a signal processor and a plurality of LED lamp beads, wherein the signal processor is used for receiving and decoding the shaped DMX signal to generate a corresponding PWM drive signal to drive the LED lamp beads to work.

In view of the problems of signal errors of the DMX signal caused by a large number of lights 4 or a long signal transmission distance between lights, the present invention provides the optocoupled isolation module 61 and the signal processing module 62 which are configured to reshape the received DMX signal to effectively filter the interference signal out of the DMX signal and correct the width of the DMX signal to avoid errors caused by the change in data rate to realize error-correction and shaping of the transmitted signal, such that the transmission distance of the DMX signal is effectively prolonged, and the problem of signal transmission errors caused by the connection of a large number of lights 4 is solved, thus improving signal transmission accuracy and stability.

The embodiments disclosed above are merely several preferred ones of the invention and are not used to limit the protection scope of the invention. For those skilled in the art various modifications and transformations can be made to the invention. Any amendments, equivalent substitutions and improvements made based on the spirit and principle of the invention should also fall within the protection scope of the invention.

The invention claimed is:

1. A light system with a signal shaping module, comprising an LED light system and a signal shaping module;

wherein the LED light system comprises a power supply, an LED controller, and a plurality of lights connected in series to the LED controller by means of a signal line; the power supply is configured to supply power to the lights, the lights are connected in series by means of a power line, and the LED controller are configured to output a DMX signal for controlling the lights to each of the light by the signal line; and wherein the signal shaping module comprises an optocoupled isolation module and a signal processing module; the optocoupled isolation module and the signal processing module are sequentially connected in series to the signal line between any adjacent two of the lights that are connected in series; the optocoupled isolation module is configured to filter out an interference signal from the DMX signal input from the signal line to a corresponding one of the adjacent two of the lights; the signal processing module is configured for automatically detecting and receiving the DMX signal processed by the optocoupled isolation module and outputting the DMX signal to the corresponding one of the adjacent two of the lights at a preset baud rate; and the preset baud rate is the same as a baud rate of the DMX signal output by the LED controller.

2. The light system with a signal shaping module according to claim 1, wherein the optocoupled isolation module is an optoisolator.

3. The light system with a signal shaping module according to claim 1, wherein the signal processing module is an MCU.

4. The light system with a signal shaping module according to claim 1, wherein each of the lights comprises a signal processor and a plurality of LED lamp beads; and the signal processor is configured for receiving and decoding the DMX signal to generate a PWM signal to drive the LED lamp beads to work.

* * * * *